April 1, 1930.  J. C. NORDGRAN  1,752,805
AUTOMOBILE OR HIGHWAY SIGNAL
Filed June 23, 1924
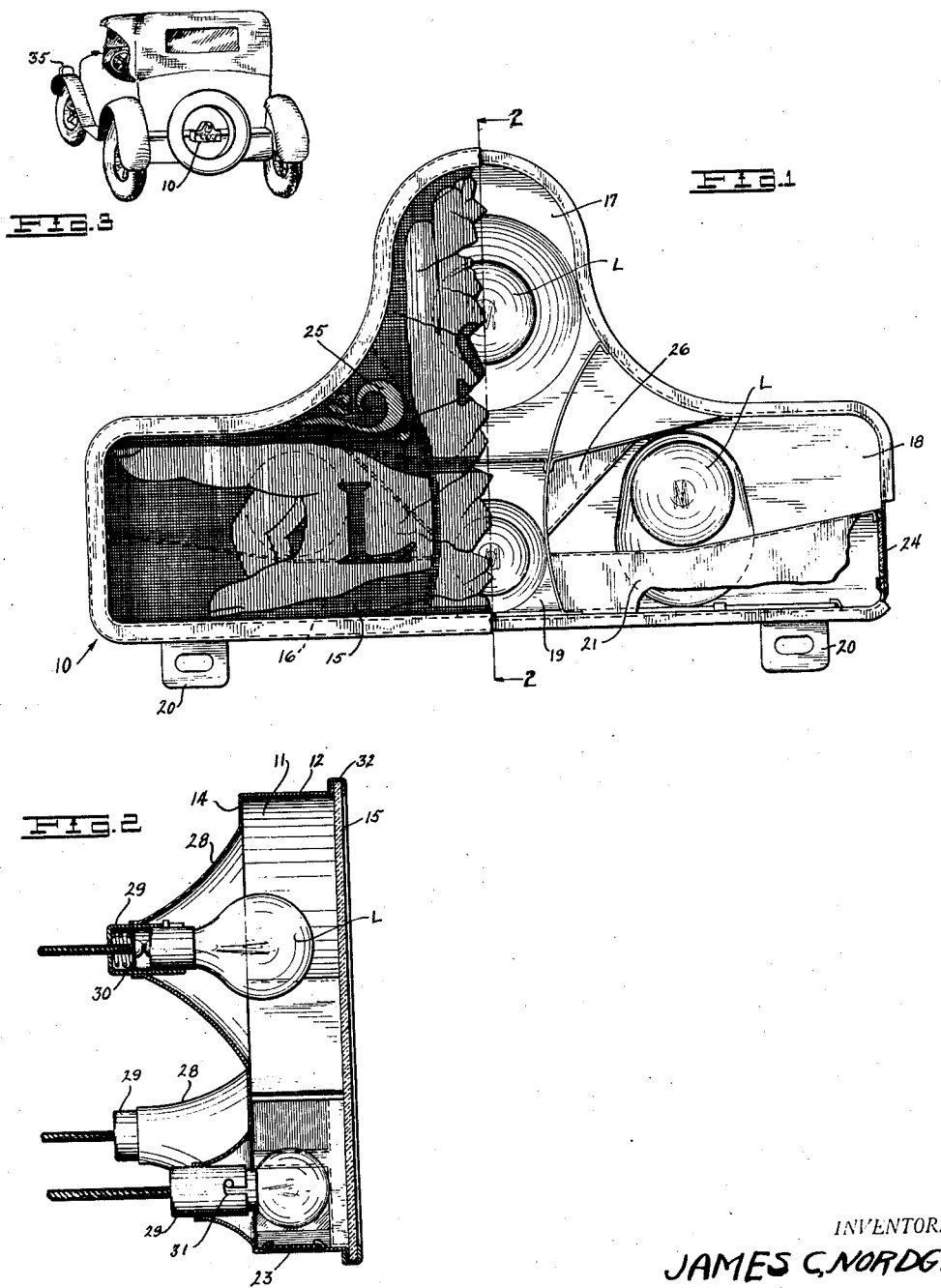
INVENTOR.
JAMES C. NORDGRAN
BY
ATTORNEY.

Patented Apr. 1, 1930

1,752,805

UNITED STATES PATENT OFFICE

JAMES C. NORDGRAN, OF SALT LAKE CITY, UTAH, ASSIGNOR, BY MESNE ASSIGNMENTS, TO C. A. HARTH, OF THE DALLES, OREGON

AUTOMOBILE OR HIGHWAY SIGNAL

Application filed June 23, 1924. Serial No. 721,768.

This invention relates to automobile and highway signals.

The general object of the invention is to provide an improved automobile signal which may be operated to indicate the intentions of the driver of the automobile.

A further object of the invention is to provide an improved automobile signal including front and rear signals wherein partitioned cases are provided and wherein the lamps and partitions are so arranged that a maximum of signalling efficiency is obtained from a minimum of lamps.

A further object of the invention is to provide an improved means for mounting the lamps of a signal in a signal box, whereby the portion of the case which supports the lamps may also act as a reflector for the light produced.

Another object of the invention is to provide a partitioned signalling box with passageways whereby the rays of light from the lamps within the box may be directed in several directions whereby the efficiency of the signal box is increased.

An additional object of the invention is to provide an improved switch and wiring means for controlling the lamps of an automobile signal.

A further object of the invention is to provide an improved mounting for the signal lamps of an automobile signal.

Other objects of the invention will be apparent from the following description taken in connection with the accompanying drawings wherein Fig. 1 is an elevation, partly in section, showing a rear signal embodying the features of my invention; Fig. 2 is a section on line 2—2, Fig. 1; Fig. 3 is a perspective view showing one arrangement of signals on the front and rear of an automobile.

Referring to the drawing by reference characters, I have shown one of the automobile signals embodying the features of my invention at 10. This signal comprises a container 11 which may be made of sheet metal or other suitable material. The container includes a body 12 having a back 14 and a front 15. The container is provided with a plurality of partitions which form compartments 16, 17, 18 and 19. Each compartment is provided with an electric light bulb L as shown and the bulbs are connected with a battery.

The lamp in compartment 19 is preferably the tail light of the automobile. The license plate may suspend from the brackets 20 and in order to illuminate the license plate, I provide inverted L-shaped members which engage the back and the bottom of the casing to provide passageways 21 which extends laterally from each side of the central compartment 19. The bottom wall of the container includes a transparent panel 23 which allows light to fall upon the license plate. The portion of each end of the container intersected by the passageway 21 is provided with a transparent panel 24 which is preferably red or green.

The front 15 of the container is preferably a transparent panel which includes a plurality of sections of different colors. The front includes a fanciful design 25 which is preferably lighted when the tail light is lighted and to bring this about a passageway 26 is arranged to lead from the compartment 19.

The portion of the cover 15 which is above the compartments 16 and 21 is shown as including oppositely pointing hands which when illuminated indicate the intentions of the driver of the automobile on which the signal is mounted. The cover over the compartment 17 also includes a hand which in this case points upwardly to indicate stop. This hand is to be illuminated when the driver applies the footbrake in stopping.

The back 14 of the container is shown as provided with recessed portions 28 which receive lamp sockets 29. The recessed portions may have their inner surfaces polished to act as reflectors for the lamps L. The lamp sockets 29 include a hollow body having a spring pressed disc 30 therein for engaging the lamp while the body is provided with a bayonet slot for engaging a boss on the lamp base.

The front 15 of the container is preferably held in place by means of a crown band 32.

A similar front signal may be employed on the front fender of an automobile as shown at 35.

It will thus be seen that I have provided an automobile signal lamp of such construction that it will efficiently function to signal right and left hand turns, as a stop signal and also as an attractive and effective tail light.

Having thus described my invention, I claim:

In a signal of the class described, a casing, a plurality of compartments in said casing, said compartments including a right, left, stop and tail light compartment, said tail light compartment being relatively small, a signal lamp in each of said compartments, said stop compartment being positioned above said tail light compartment and said right and left compartments being positioned one on each side of said tail light compartment, translucent covers for said compartments, a light emitting panel in each end of said casing, a light emitting panel in the bottom of said casing, means to illuminate both end panels and said bottom panel from the lamp in said tail light compartment, said means including tunnels formed in said right and left compartments extending from each side of said tail light compartment to each of said end panels, two additional compartments adapted to be illuminated by the lamp in said tail light compartment, said additional compartments being positioned one above each of said right and left compartments and at the side of the top compartment and separated therefrom, and a tunnel leading from said tail light compartment through said right and left compartments to said additional compartments.

In testimony whereof, I hereunto affix my signature.

JAMES C. NORDGRAN.